2,947,696

CALCIUM BASE GREASE CONTAINING A CALCIUM SALT OF AN AMIDIC ACID

John Walter Nelson, Lansing, Ill., assignor to Sinclair Refining Company, New York, N.Y., a corporation of Maine No Drawing. Filed Apr. 22, 1957, Ser. No. 654,084

2 Claims. (Cl. 252—33.6)

This invention relates to lubricating greases containing salts of amidic acids.

I have found that anhydrous greases having a high dropping point and excellent shear and working stability can be obtained by including salts of certain complex amidic acids in a lubricating oil grease. Thus the greases of my invention include a lubricating oil base and about 0.2 to 50, preferably about 10 to 25, percent by weight on the grease of a salt of the general formula

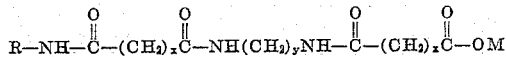

in which R is an alkyl radical containing from 1 to 22 carbon atoms, $x$ is a number from 0 to 8, $y$ is a number from 2 to 10, and M is an alkaline metal of groups I and II.

The salts employed in producing the greases of my inveniton can be prepared by slowly adding one mole of a suitable diamine to each two moles of a suitable dibasic acid in a small amount of, for example, xylene at reflux temperature and removing the water formed in the reaction by azeotropic distillation. After two moles of water have been removed for each two moles of dibasic acid, a suitable monoamine is then slowly added to the resulting dibasic acid diamide in an amount sufficient to amidify one of the acid groups and the additional water formed is also removed by azeotropic distillation. The excess xylene is distilled off and the resulting complex amidic acid needs no further purification prior to neutralization to form the salt. No catalyst is required when preparing these amidic acids, and the amount of water obtained compared to the theoretical amount indicates the degree of completion of the reaction. No purification of the product is required even though some unreacted amine and/or acid may be present. Preferably the diamine to acid ratio is about 1 to 2 and the monoamine to diamide ratio is about 1 to 1, although these can vary since the presence of some unreacted amine or acid is permissible.

Suitable diamines include, for example, ethylene diamine and its higher homologues such as tetramethylene diamine, pentamethylene diamine and octamethylene diamine. Suitable monoamines include, for example, methyl amine, ethyl amine, n-propyl amine, methyl ethyl amine, octylamine, decylamine, tetradecylamine, and octadecylamine. Thus the monoamine can be primary or secondary and the alkyl group of the amine can be saturated or unsaturated or branched or straight chained. Suitable dicarboxy acids include, for example, malonic, maleic, succinic, citraconic, fumaric, itaconic, glutaric, adipic, pimelic, suberic, azelaic, sebacic acids, etc. The acids, diamines and monoamines, can be substituted or unsubstituted but if substituted the substituents should be non-reactive in the system.

The materials employed to provide the salt forming cations are, for example, inorganic compounds such as the oxides, carbonates and hydroxides of the alkali and alkaline earth metals, particularly lithium, sodium, calcium, barium and strontium. Mixtures of materials providing mono- and polyvalent cations, e.g., sodium and calcium can be used with advantage. For example, half of the stoichiometrical amount for complete neutralization of a monovalent cation can be used and then a polyvalent cation can be used to couple two or more molecules.

I have also found that the calcium salts of the complex amidic acids prepared, for instance, from ethylene diamine, sebacic acid and octadecylamine improve the bleed characteristics of anhydrous lime greases. For example, the problem of meeting the MIL-G-10924A bleed test specification of 7.5% maximum bleed with available base oils and conventional fats has been extremely difficult. The grease must have shear stability in the Shell muller test, i.e., not become 45 penetration points softer nor 25 penetration points harder after 100 hours. It must not become 45 penetration points softer after admixing it with 10 weight percent of water and working it 100,000 strokes on the ASTM mechanical worker. But the most stringent specification of all is the pressure bleed test. In order to pass the —65° F. pressure viscosity at 25 reciprocal seconds specifications of 11,500 to 17,500 poises, it is necessary to use a low viscosity oil. Greases made with low viscosity oils bleed more than those made with more viscous oils. Therefore, this bleed test specification is difficult to meet when using conventional oil thickeners. The use in grease manufacture of my complex amidic acids with, for example, 12-hydroxy stearic acid enable one to pass to MIL-G-10924A specification with an anhydrous lime grease.

Thus the greases of my invention can be prepared by use of the complex amidic acid salts as the essential or even sole soap for thickening the base oil to grease consistency or these salts can be used with conventional soaps such as the alkaline metal, for instance the group I alkali metal or group II alkaline earth metal salts of 12-hydroxy stearic acid to improve the bleed characteristics of greases made with such soaps. When the complex amidic acid salts are employed as the essential or sole grease-forming soap, they are present in an amount sufficient to thicken the lubricating base oil to grease consistency. This generally is about 5 to 50, preferably 10 to 25, percent by weight on the finished grease. When, however, the complex amidic acid salts are employed together with another grease-forming soap, such as the calcium soap of 12-hydroxy stearic acid, the complex amidic acid salts are present in an amount sufficient to improve the bleed characteristics of the finished grease. Generally, this is, for example, 0.2 to 5 or more percent by weight on the finished grease, the other soap being present in an amount sufficient to thicken the oil to grease consistency, i.e., 5 to 50 percent by weight on the finished grease. Thus in my greases the amidic acid salts can constitute about 0.2 to 50 percent by weight of the finished product.

The lubricating base material, which is the major component of my greases, can be a mineral lubricating oil fraction of the conventionally refined or solvent refined type. The mineral lubricating oil fraction can be derived from a paraffinic, naphthenic or Mid-Continent crude and can have a viscosity of 50 SUS at 100° F. to 200 SUS at 210° F. Also the lubricating base material can be a synthetic oil. Among the synthetic lubricants which can be used are polymerized olefins, alkylated aromatics, silicone polymers, polyalkylene glycols and their partial or complete ethers and esters. Also I can use synthetic lubricants such as diesters of dibasic acids, e.g., di-(2-ethyl hexyl) sebacate and di-(isooctyl) azelate, and the like.

The salt can be formed in the presence or absence of the lubricating oil base but preferably is formed in the presence of water and at least a portion of the lubricating oil base. Thus, for example, the lubricating base, water, the acid and an alkali are charged to a conventional grease kettle, the proportions being such that the anhydrous grease contains the desired salt concentration. The mixture is then gradually heated with stirring to a temperature higher than 300° F. until an anhydrous grease is obtained.

Premium grease compositions characteristically are substantially anhydrous, i.e., the finished greases have a water content below about 0.10 weight percent and preferably below about 0.05 weight percent. Grease compositions of the instant invention also are substantially anhydrous. Dehydration to result in this state can be accomplished in any manner but preferably by maintaining the temperature of the reaction mass, after completion of saponification, at a temperature above the boiling point of water for about 2 to 4 hours. While dehydration can be affected after finishing oil has been added, it is preferred to dehydrate prior to the addition of finishing oil in order that less material need be handled.

Materials normally incorporated in greases to impart special characteristics can be added to our compositions. These include oxidation inhibitors, corrosion inhibitors, extreme pressure agents and anti-wear agents. The amount of additives added to the grease compositions usually ranges from about 0.01 weight percent up to about 10 weight percent and, in general, can be employed in any amounts desired so long as the present invention is not deleteriously affected.

The following examples further illustrate the greases of my invention.

The complex amidic acid employed in these examples was of the formula

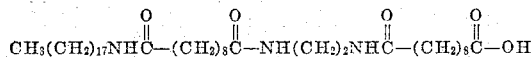

It was prepared by slowly adding to 2 moles of sebacic acid, in about 0.2 mole of xylene at reflux temperature, one mole of ethylene diamine and then continuing to heat the mixture until 2 moles of water were removed by azeotropic distillation. The resulting dicarboxylic acid diamide was then treated with one mole of octadecylamine to convert one of the acid groups to an amide. After one mole of water was removed by azeotropic distillation, the xylene was distilled off and the complex amidic acid needed no further purification.

EXAMPLE I

A lithium grease was prepared as follows. To one pound of the complex amidic acid described above dispersed in four pounds of a conventionally refined coastal oil having a viscosity of 300 SUS at 100° F. in a grease kettle at 270° F., were added slowly, 32 grams of lithium hydroxide monohydrate dissolved in 150 grams of water. The mixture was then stirred and heated to 360° F. over 1.25 hours. Heating was then discontinued and while stirring and cooling to 155° F., 3.7 pounds of the same oil were added to make the soap concentration 11.5%. The grease was then milled at 0.005" clearance on a Charlotte colloid mill.

EXAMPLE II

A sodium grease was prepared as follows. To 300 grams of the acid dispersed in 600 grams of the same oil as in Example I at 233° F. in a grease kettle, 23 grams of sodium hydroxide dissolved in 23 grams of hot water were added. Then 300 grams more oil were added while heating and stirring the mixture. During the next 2.75 hours while stirring and heating the kettle contents to 320° F., 1200 grams of oil were added to make the soap concentration 12.5%. The kettle contents were then allowed to cool to room temperature while stirring. This sodium grease is sensitive to water as are most sodium greases. It is a satisfactory grease for ambient temperature lubrication but at temperatures of 200° F. and above, the grease of this particular soap content has diminished lubricating ability.

EXAMPLE III

An anhydrous lime grease was prepared as follows. To 300 grams of the acid dispersed in 300 grams of a solvent refined Mid-Continent oil having a viscosity of 53 SUS at 100° F., in a grease kettle at 210° F., were added 22 grams of hydrated lime slurried in 600 grams of the same oil. Heat was applied to the kettle and 10 minutes later 150 grams of water were added. While stirring and heating to 300° F. during the next hour, 1200 grams more of the same oil were added to make the soap concentration 12.5%. The mass was stirred and heated another 30 minutes until the temperature reached 314° F. It was then allowed to cool with stirring until the temperature dropped to 235° F. The grease was not milled.

The following Table I gives the data on the lithium, and anhydrous lime greases of Examples I and III made with the complex amidic acid as the only fatty material.

*Table I*

| Metal | Lithium | Calcium |
|---|---|---|
| Per cent Soap | 11.5 | 12.5. |
| Milling (Charlotte) | 0.005" (155° F.) | None. |
| Penetrations: | | |
| Unworked | 286 | 241. |
| After 60 strokes | 320 | 291. |
| After 100 M Strokes | 400 | 401. |
| Change | +80 | +110. |
| Dropping Point, ° F | 495 | 373. |
| Wheel Bearing Test 220° F | Pass | Pass. |
| Boiling Water Test: | | |
| Tap Water | Good | Good. |
| Distilled Water | Good | Good. |
| Pressure Viscosity −65° F.: | | |
| 25 Sec.⁻¹ Poises | | 11,000. |
| 100 Sec.⁻¹ Poises | | 3,900. |
| MIL-G-10924A Bleed Test, Percent | | 6.5. |

EXAMPLE IV

Four anhydrous lime greases were prepared generally according to the procedure described in Example III. The oil used was a solvent refined Mid-Continent oil having a viscosity of 63.6 SUS at 100° F. In the first grease, 12-hydroxy stearic acid was used as the sole soap-forming acid and in the other three greases, an 80:20 mixture of 12-hydroxy stearic acid and the complex amidic acid was used as the soap-forming acid. All of these greases had 0.6 weight percent Ortholeum 300 as an oxidation inhibitor and 2.5 weight percent free hydrogenated castor oil. The following Table II contains test data obtained on these greases.

*Table II*

| | | | | |
|---|---|---|---|---|
| Soap Percent | 10.5 | 10.5 | 10.5 | 10.5 |
| Acid Ratio: | | | | |
| 12 OH Stearic, Percent | 100 | 80 | 80 | 80 |
| Complex Amidic, Percent | | 20 | 20 | 20 |
| Free Hydrogenated Castor oil, Percent | 2.5 | 2.5 | 2.5 | 2.5 |
| Penetrations: | | | | |
| Unworked | 238 | 226 | 213 | 245 |
| After 60 Strokes | 279 | 267 | 267 | 276 |
| After 100 M Strokes | 304 | 311 | 296 | 336 |
| After 100 M Strokes (10% H₂O) | 298(+19) | 272(+5) | 284(+17) | 287(+11) |
| Dropping Point, ° F | 298 | 295 | 298 | 296 |
| Pressure Viscosity −65° F.: | | | | |
| 25 Sec.⁻¹ Poises | 16,200 | 15,000 | 15,000 | 14,600 |
| 100 Sec.⁻¹ Poises | 6,000 | 5,800 | 5,500 | 4,850 |
| MIL-G-10924A Bleed Test, Percent | 8.1 | 5.1 | 4.6 | 5.7 |
| Shell Muller Test, Pen. Change | −30 | −5 | −3 | −6 |
| Norma-Hoffman Oxidation Test: | | | | |
| Regular Press. Drop 500 Hours | <10 | 4 | 2 | |
| Bronze Block Press. Drop 500 Hours | <10 | 5 | 4 | |
| Wheel Bearing Test 250° F | Fair | | | |
| Evaporation Test MIL-G-10924A | <5.0 | 3.2 | | |

The data in the above Table II show that the complex amidic acid, when used with 12-hydroxy stearic acid, improves the bleed characteristics of anhydrous lime greases so that they pass the MIL-G-10924A bleed test specification of 7.5% maximum bleed. Furthermore, they pass the —65° F. pressure viscosity at 25 reciprocal seconds specifications of 11,500 to 17,500 poises, by a safe margin. Anhydrous calcium 12-hydroxy stearate greases made with 53 SUS viscosity at 100° F. oil, have a —65° F. pressure viscosity of about 13,000 poises at 25 sec.$^{-1}$ while an anhydrous lime grease made with the complex amidic acid in the same viscosity oil, has a —65° F. pressure viscosity of 11,000 poises at 25 sec.$^{-1}$ (see column 3 in Table I above).

I claim:

1. An anhydrous lubricating grease consisting essentially of a lubricating base oil and a grease-forming soap in an amount sufficient to thicken the base oil to grease consistency, the grease-forming soap consisting essentially of the calcium soaps of 12-hydroxy stearic acid and the acid having the formula

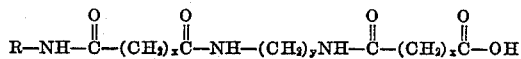

in which R is an alkyl radical containing from 1 to 22 carbon atoms, $x$ is a number from 0 to 8, and $y$ is a number from 2 to 10, the latter acid soap constituting about 0.2 to 5 percent by weight on the finished grease.

2. An anhydrous lubricating grease consisting essentially of a lubricating base oil and a grease-forming soap in an amount sufficient to thicken the base oil to grease consistency, the grease forming soap consisting essentially of the calcium soaps of 12-hydroxy stearic acid and the acid having the formula

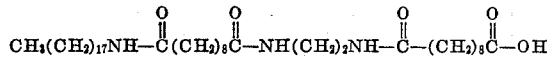

the latter acid soap constituting about 0.2 to 5 percent by weight on the finished grease.

References Cited in the file of this patent

UNITED STATES PATENTS

| | | |
|---|---|---|
| 2,607,734 | Sproule et al. | Aug. 19, 1952 |
| 2,752,312 | Dixon | June 26, 1956 |